United States Patent [19]
Snyder

[11] Patent Number: 5,181,224
[45] Date of Patent: Jan. 19, 1993

[54] MICROOPTIC LENSES

[75] Inventor: James J. Snyder, San Jose, Calif.

[73] Assignee: University of California, Livermore, Calif.

[21] Appl. No.: 697,974

[22] Filed: May 10, 1991

[51] Int. Cl.$^5$ ............................................... H01S 3/08
[52] U.S. Cl. ................................... 372/101; 359/710
[58] Field of Search ......................... 359/710; 372/101

[56] References Cited
U.S. PATENT DOCUMENTS 4,203,652  5/1980  Hanada ............................. 359/710
4,627,068  12/1986  Johnson et al. ..................... 372/101

Primary Examiner—Léon Scott, Jr
Attorney, Agent, or Firm—Henry P. Sartorio

[57] ABSTRACT

The present invention provides several novel diffraction limited microlens configurations which are especially valuable for use in conjunction with laser diodes, and optical fibers. Collimators, circularizers and focusers (couplers) are provided.

35 Claims, 10 Drawing Sheets

MICROOPTIC LENSES

The United States Government has rights in this invention pursuant to Contract No. W-7405-Eng-48 between the United State Department of Energy and the University of California for the operation of Lawrence Livermore National Laboratory.

CROSS REFERENCE TO RELATED APPLICATIONS

This application is related to copending application Ser. No. 07/591,462, titled Method for Fabrication of Cylindrical Microlenses of Selected Shape, filed Sep. 28, 1990 by James J. Snyder and Thomas M. Baer and also copending application Ser. No. 07/591,409, titled Laser Diode Assembly Including a Cylindrical Lens, filed Sep. 28, 1990 by James J. Snyder and Patrick Reichert, both of which are hereby incorporated by reference as if fully set forth herein.

BACKGROUND OF THE INVENTION

1. Field of the Invention

The present invention relates generally to microlenses, and more particularly to microlenses for use with laser diodes and integrated optics.

2. Description of Related Art

The related art is described in the section of the same name in each of the above-referenced applications of which this application is a CIP.

SUMMARY OF THE INVENTION

The present invention provides several novel diffraction limited microlens configurations which are especially valuable for use in conjunction with laser diodes.

The first two configurations are Crossed Lens Collimators. This configuration converts the astigmatic elliptical output beam from a typical low-power laser diode into a small (e.g., around 100 microns diameter), circular, diffraction limited collimated beam. The laser diode with lens assembly would be very compact and would provide a small laser beam over propagation distances of several tens of centimeters. This might be particularly attractive to the manufacturers of bar code scanners, for example, since the beam would be round and would contain most of the light from the laser diode.

The third configuration is a Circularizer. This configuration converts the highly divergent, astigmatic, and elliptical cross section output beam from a typical laser diode into a moderately divergent, spherical wave with a circular cross section which appears to emanate from a virtual point source. This configuration would be of use to people who wish to collimate or focus the laser beam at some fairly large diameter compared to the 100 microns or so available with the Crossed Lens Collimator. Since the laser diode with the lens would mimic a conventional point source of a few microns diameter, it could be collimated or tightly focussed using an inexpensive, macroscopic, conventional lens of moderate speed. This could be applicable to compact disk recorders and players, laser printers, bar code scanners, and laser range finders.

The fourth configuration is a Crossed Lens Focuser. This configuration is similar to the Crossed Lens Collimator in appearance but the design provides for focussing to a circular spot at some finite distance from the optic. One possible application is for coupling laser diode light into a single mode optical fiber. This application requires that the light be focussed so that it matches the Numerical Aperture of a single mode optical fiber, typically about 0.1. If the optic is diffraction limited, the coupling from the diode into the fiber can be nearly 100%.

All of these configurations display the surprising result that the effect on the wavefront surface of any lens aberration, not just those due to errors in fabricating the preform, scale with the lens size. That is, if a particular lens design is reduced in all its dimensions by some factor, the wavefront distortion due to aberrations in the lens is reduced by the same factor. This includes, for example, aberrations due to the divergence of the laser diode beam in the direction parallel to the lens axis. This means that lens configurations which would be useless due to aberrations when using macroscopic lenses can provide diffraction limited performance when scaled to sizes of the order of a few hundred micrometers. In particular, a crossed cylinder lens configuration can provide a diffraction limited circular beam 100 microns in diameter in spite of the severe aberrations along the diagonals between the lens' axes.

DETAILED DESCRIPTION OF THE PREFERRED EMBODIMENT

For purposes of the following discussion, lens surfaces will be described in terms of the sag, or z-axis height of the surface relative to the vertex height, as a function of the radius. All of these lenses are cylindrical, so that the sag is given as a function of x, and is independent of y. A convenient equation for a lens surface is the general equation for a conic section, since many aspheric designs are in fact conic sections in first approximation. Quadratic (and higher order terms) can be added to the equation if desired.

The equation we use to describe the sag z of a cylindrical lens as a function of the distance x from the axis of the lens is $$z = \frac{cx^2}{1 + \sqrt{1 - sc^2x^2}} + a2x^2,$$

where c is the curvature of the lens surface, s is the lens shape, and a2 is the coefficient of the quadratic term used if needed to optimize the lens design. These three parameters plus the distance z0 from the diode to the vertex of the curved surface, and the width w and height h of the lens is given for each of the lens designs disclosed. For all designs, the lens material is SFL6 glass (available from Schott Glass). All of these lenses are preferably fabricated by the pulling technique disclosed in the two U.S. patent applications Ser. Nos. 07/591,462 and 07/591,409, referenced above.

Figure 1A:
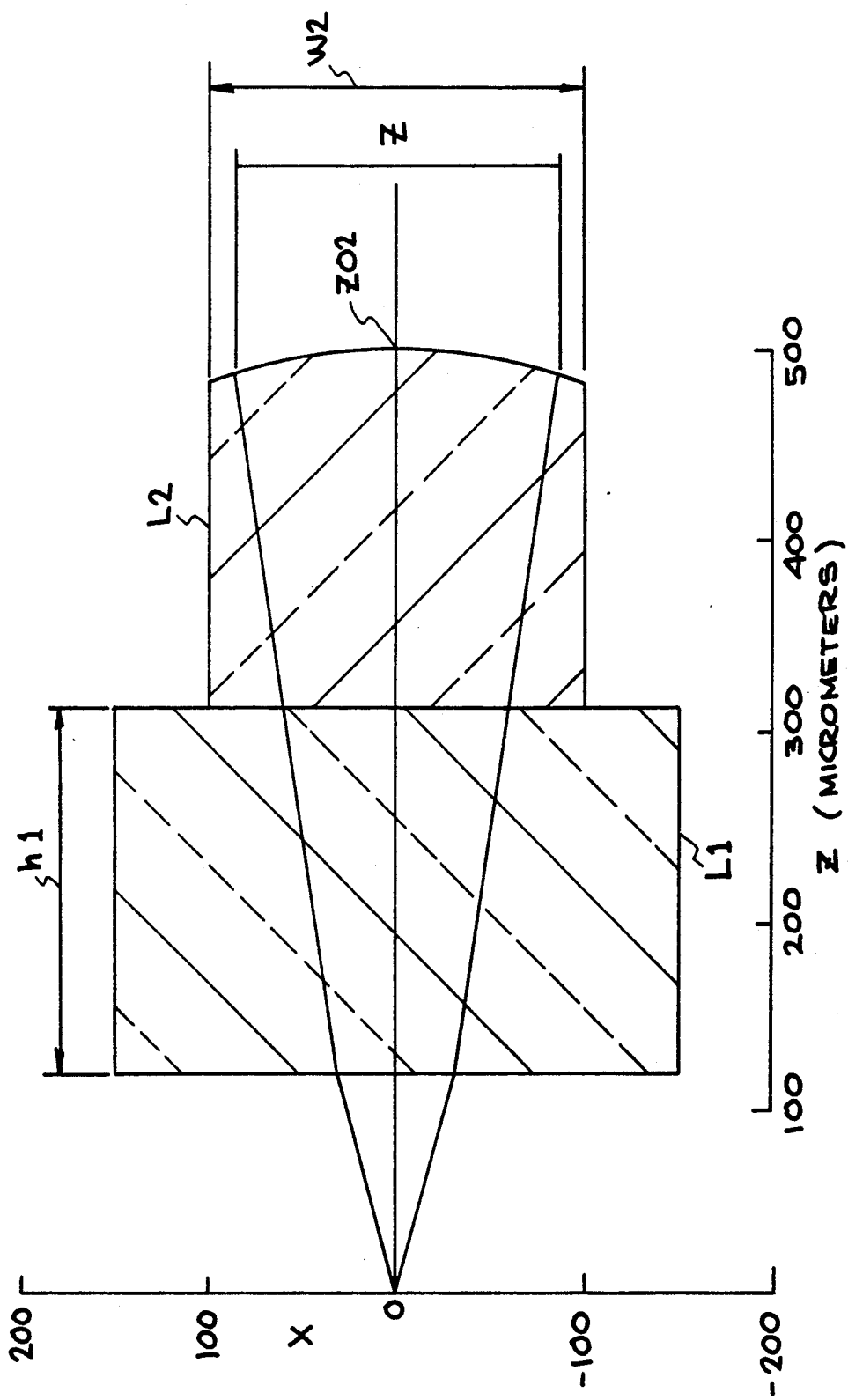
FIGS. 1A and 1B show orthogonal views of a first preferred embodiment of a crossed lens collimator.
Figure 1B:
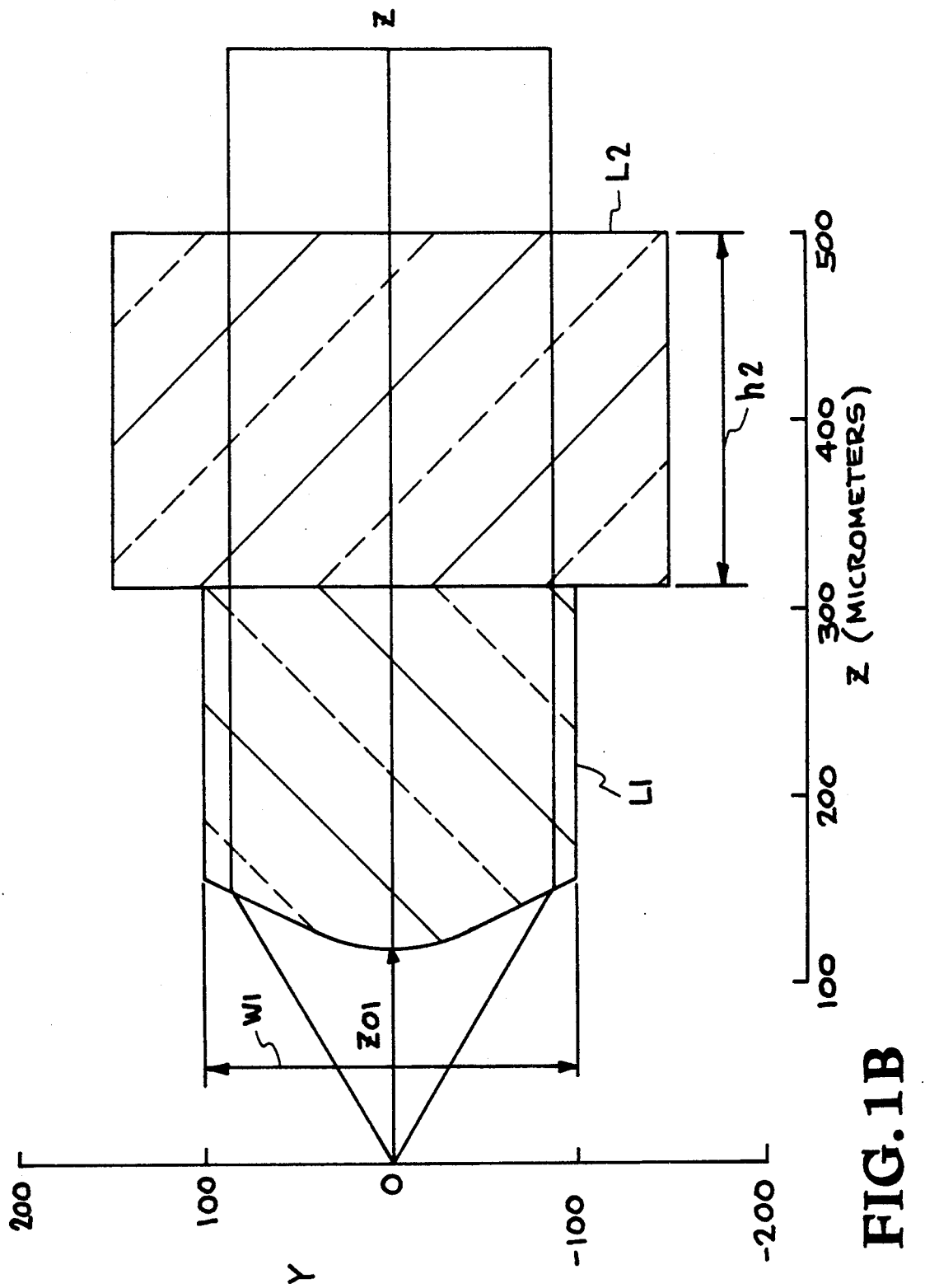

Shown in FIGS. 1A and 1B is a first preferred embodiment of a crossed lens collimator. In this particular embodiment the lens system is optimized to collimate a Toshiba TOLD9211 visible laser diode, which has 13 microns astigmatism and 29 degrees half angle divergence (the "fast" axis) by 8.6 degrees divergence half angle (the "slow" axis). The diode is located at the origin of the axes.

The system is made up of two plano-convex cylindrical lenses. The two cylindrical lenses are oriented orthogonally to each other, with the cylinder axis of the first lens parallel to the x-axis and the cylinder axis of the second lens parallel to the y-axis. The first lens L1 is optimized for collimating light in the plane of the fast axis. The second lens L2, which is rotated 90 degrees about the optical axis (z-axis) from L1, is optimized for collimating along the slow axis. Although the figures show the two lenses as being juxtaposed, which is sometimes convenient, for some applications it may be desirable for them to be separated. The spacing between the curved surfaces of the lenses is chosen to achieve a desired ellipticity, (i.e. aspect ratio). The following table provides the details of the optical system with the ellipticity chosen to be unity (i.e. a circular output beam).

First lens L1 (nearest diode):
  $c1 = 0.010684$/micron
  $s1 = -2.1684$
  $z01 = 118$ microns
  $w1 = 200$ microns
  $h1 = 220$ microns
Second lens L2:
  $c2 = 0.002518$/micron
  $s2 = 0.5745$
  $z02 = 780$ microns
  $w2 = 443$ microns
  $h2 = 443$ microns This configuration converts the astigmatic, elliptical output beam from a typical low-power laser diode into a small (e.g., around 100 microns diameter), circular, diffraction limited collimated beam. The laser diode with lens assembly would be very compact and would provide a small laser beam over propagation distances of several tens of centimeters. This might be particularly attractive to the manufacturers of bar code scanners, for example, since the beam would be round and would contain most of the light from the laser diode.

Figure 2A:
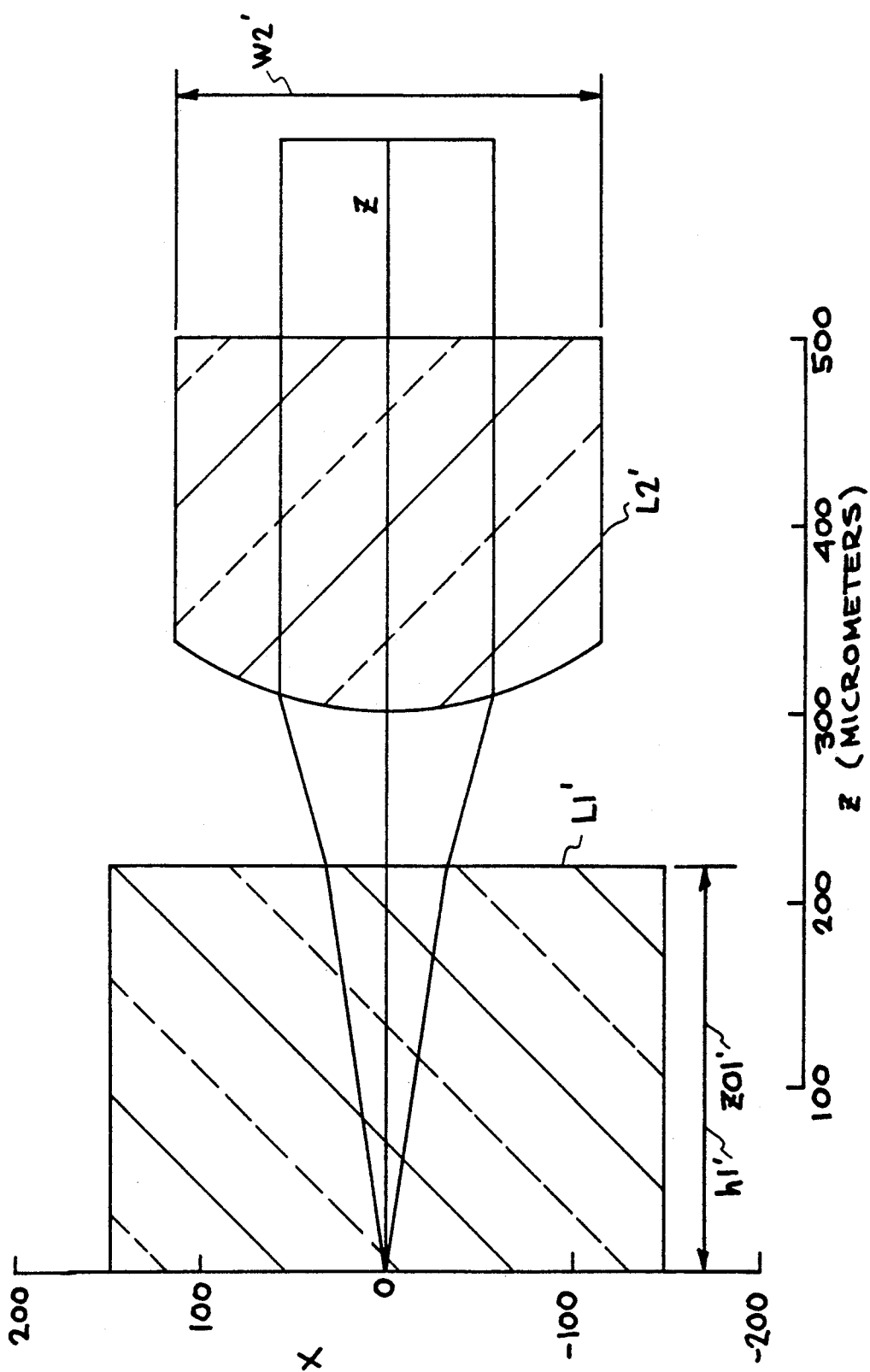
FIGS. 2A and 2B show orthogonal views of another preferred embodiment of a crossed lens collimator.
Figure 2B:
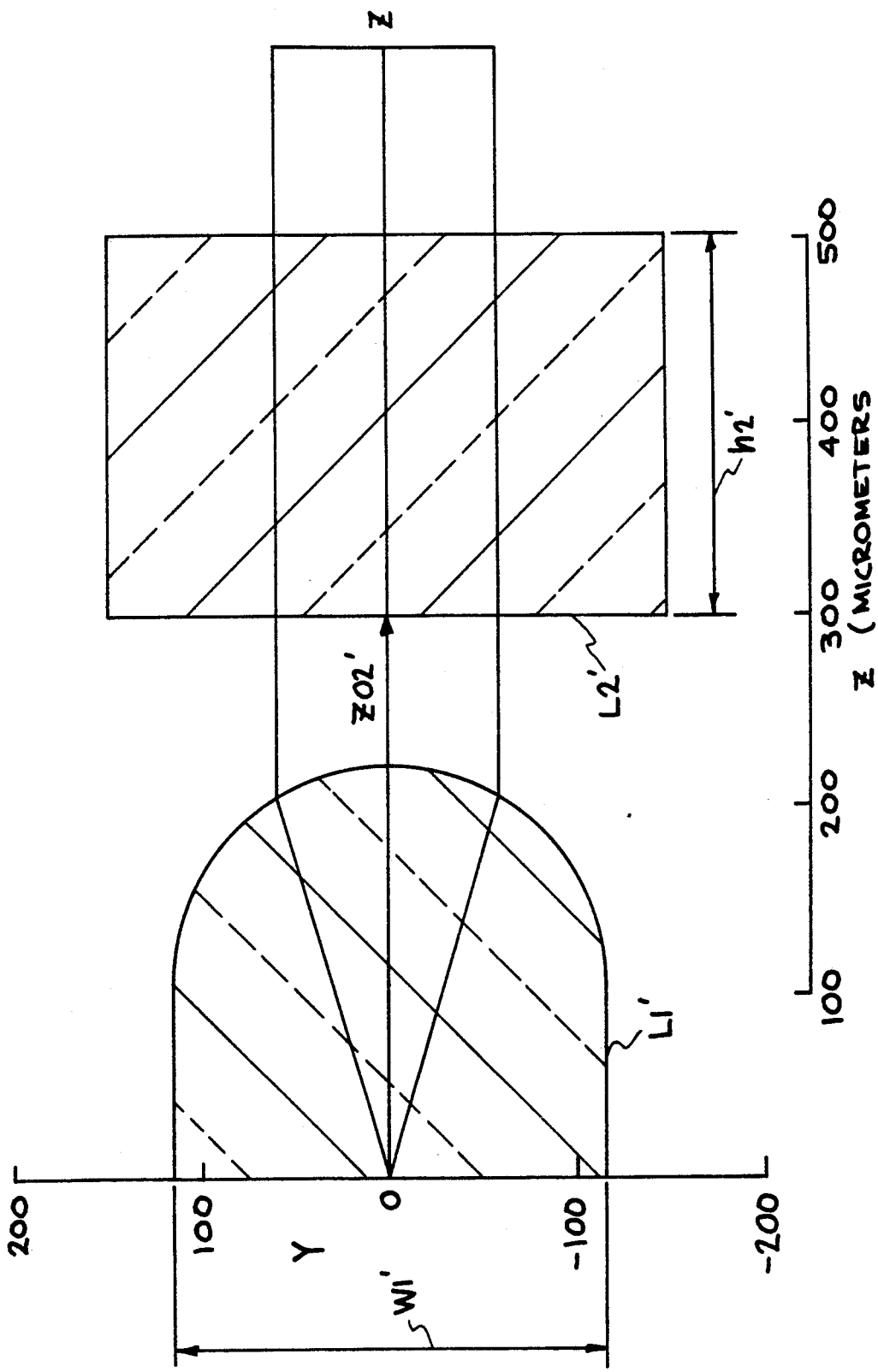

FIGS. 2A and 2B illustrate another preferred embodiment of a crossed lens collimator. In this configuration lens L1' is an immersion lens adjacent the laser diode (and preferably optically cemented thereto). Lens L2' is spaced apart from L1' to achieve ellipticity of unity; however other spacings will produce other ellipticities. The following table provides the details of this embodiment, which is designed to collimate a laser diode source with divergences of 30 degrees by 15 degrees (half-angle). Astigmatism is assumed to be zero, but minor modifications in the position of the second lens surface can be made to compensate for any astigmatism.

Figure 3A:
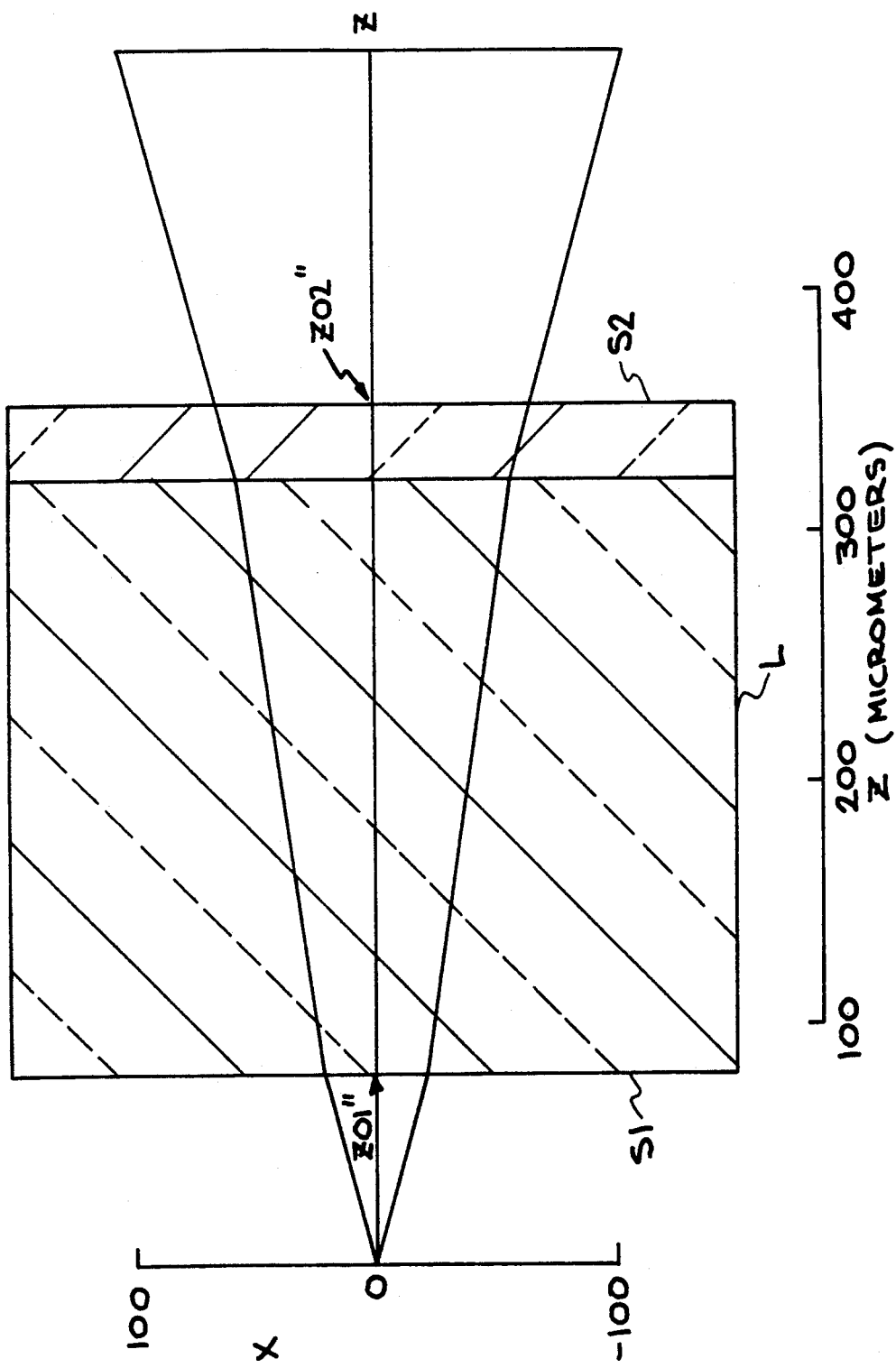
FIGS. 3A and 3B show orthogonal views of the details of a single-element lens diode beam circularizer.
Figure 3B:
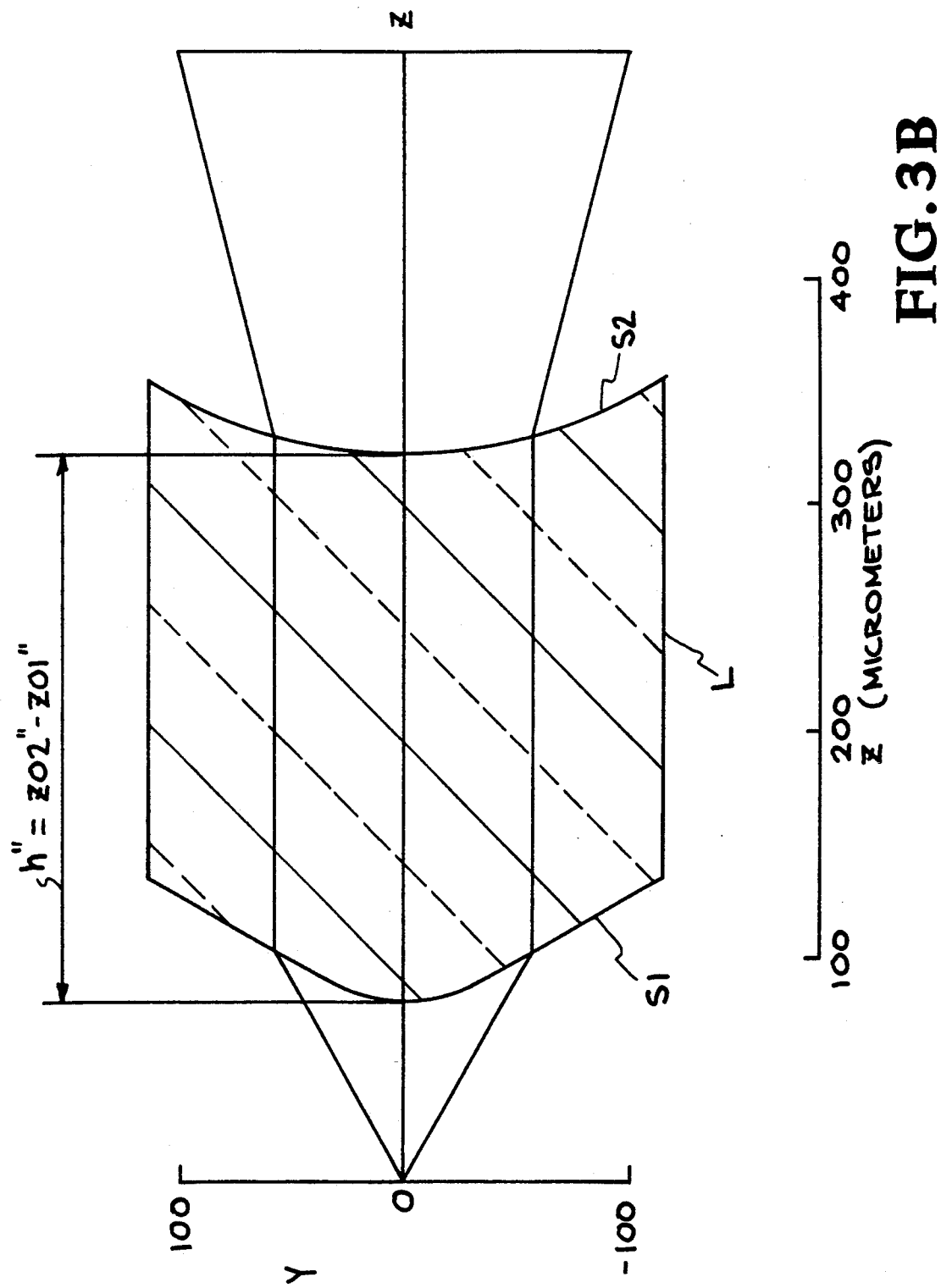

First lens L1'(nearest diode):
  $c1' = 0.010373$/micron
  $s1' = 0.684383$
  $z01' = 220$ microns
  $w1' = 230$ microns
  $h1' = 220$ microns
Second lens L2':
  $c2' = 0.0063$/micron
  $s2' = -1.9412$
  $z02' = 300$ microns
  $w2' = 230$ microns
  $h2' = 200$ microns FIGS. 3A and 3B illustrate the details of a single-element lens diode beam circularizer. This convex-concave lens circularizes and symmetrizes the output from a SONY SLD151/V visible laser diode. The laser astigmatism is 35 microns, and the divergence is 22.5 degrees by 8.2 degrees (half angle).

First surface S1 (convex, nearest diode):
  $c = 0.010481$/micron
  $s = -2.222482$
  $z01'' = 120$ microns
  $w = 410$ microns
  $h'' = 410$ microns (vertex to vertex)
Second surface S2 (concave):
  $c' = 0.00330$/micron
  $s' = -2.143688$
  $z02'' = 530$ microns The first surface S1 reduces the divergence of the output beam along the fast axis of the diode. The second surface S2 is located at a distance from S1 in order to provide a desired ellipticity, and is shaped to change the divergence of the output beam along the fast axis to coincide with the slow axis. Note that other surface shapes and spacings can be selected to provide differing amounts of divergence along the fast axis.

This configuration converts the highly divergent, astigmatic, and elliptical cross section output beam from a typical laser diode into a moderately divergent, spherical wave with a circular cross section which appears to emanate from a virtual point source. This configuration would be of use to people who wish to collimate or focus the laser beam at some fairly large diameter compared to the 100 microns or so available with the Crossed Lens Collimator. Since the laser diode with the lens would mimic a conventional point source of a few microns diameter, it could be collimated or tightly focussed using an inexpensive, macroscopic, conventional lens. This could be applicable to compact disk recorders and players, laser printers, bar code scanners, and laser range finders.

Figure 4A:
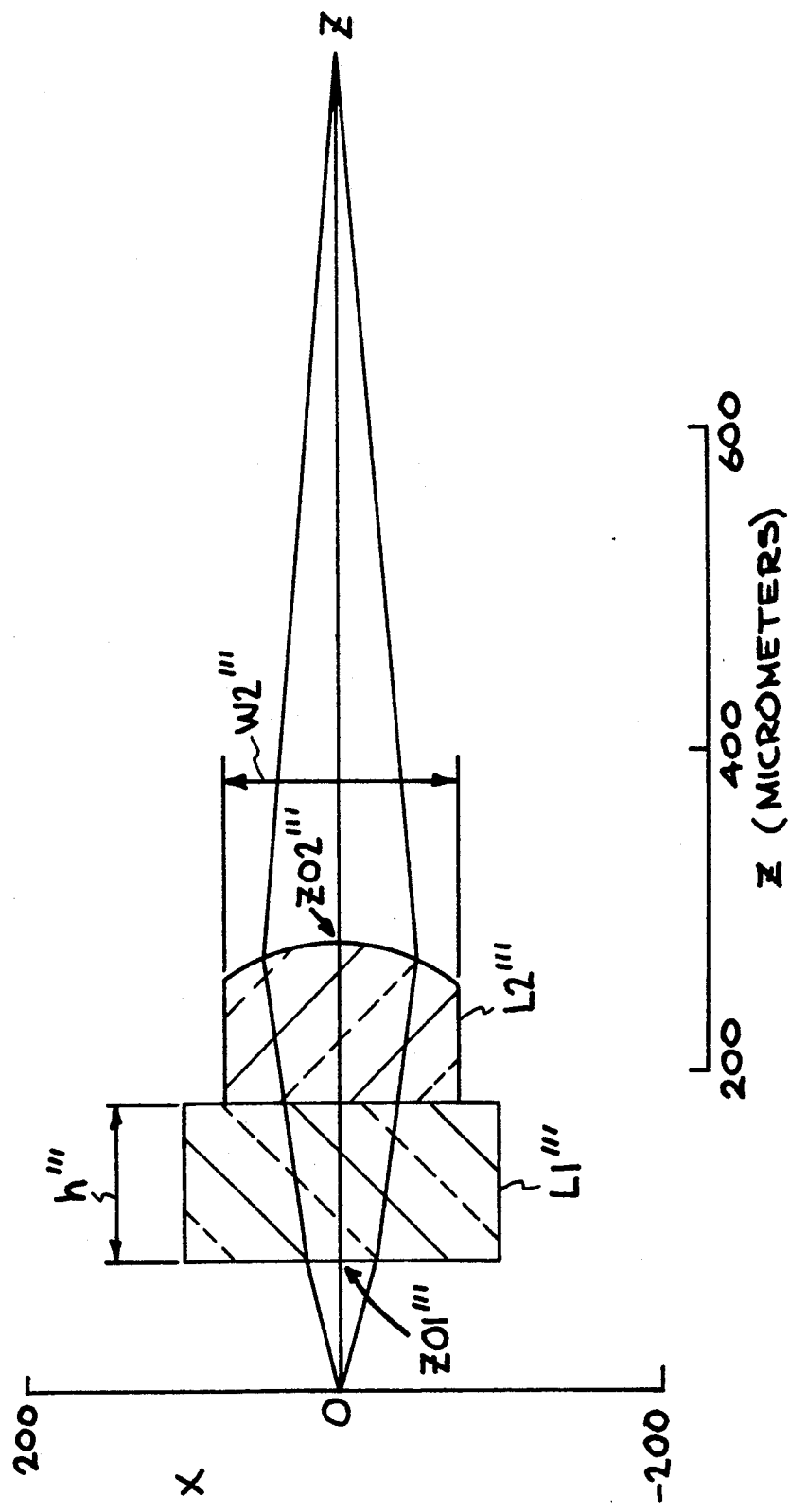
FIGS. 4A and 4B show orthogonal views of a preferred embodiment of a single mode diode fiber coupler.
Figure 4B:
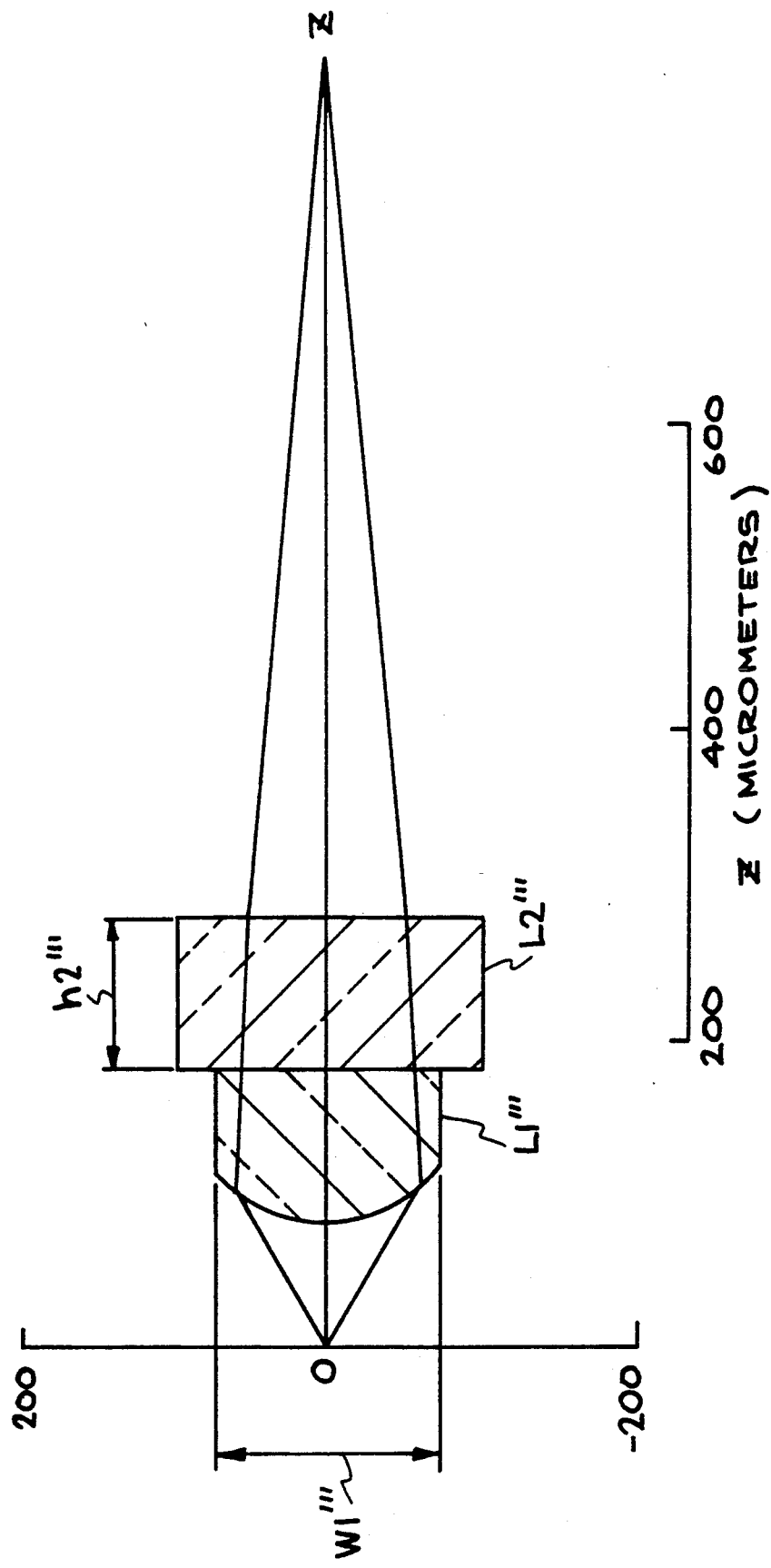

FIGS. 4A and 4B illustrate a preferred embodiment of a single mode diode fiber coupler (or focuser). This design focuses the light from a SONY SLD151/V visible laser diode into a single mode optical fiber with N.A.=0.1. In this embodiment, the numerical aperture of the focussed beam matches the numerical aperture of the optical fiber, thus providing optimal mode matching of the light to the single mode optical fiber, and thereby maximizing the coupling efficiency. The laser astigmatism is 35 microns, and the divergence is 22.5 degrees by 8.2 degrees (half angle). The focuser is similar to the collimator except that it focuses light at a finite distance from the lens while the collimator focuses at infinity.

Figure 5A:
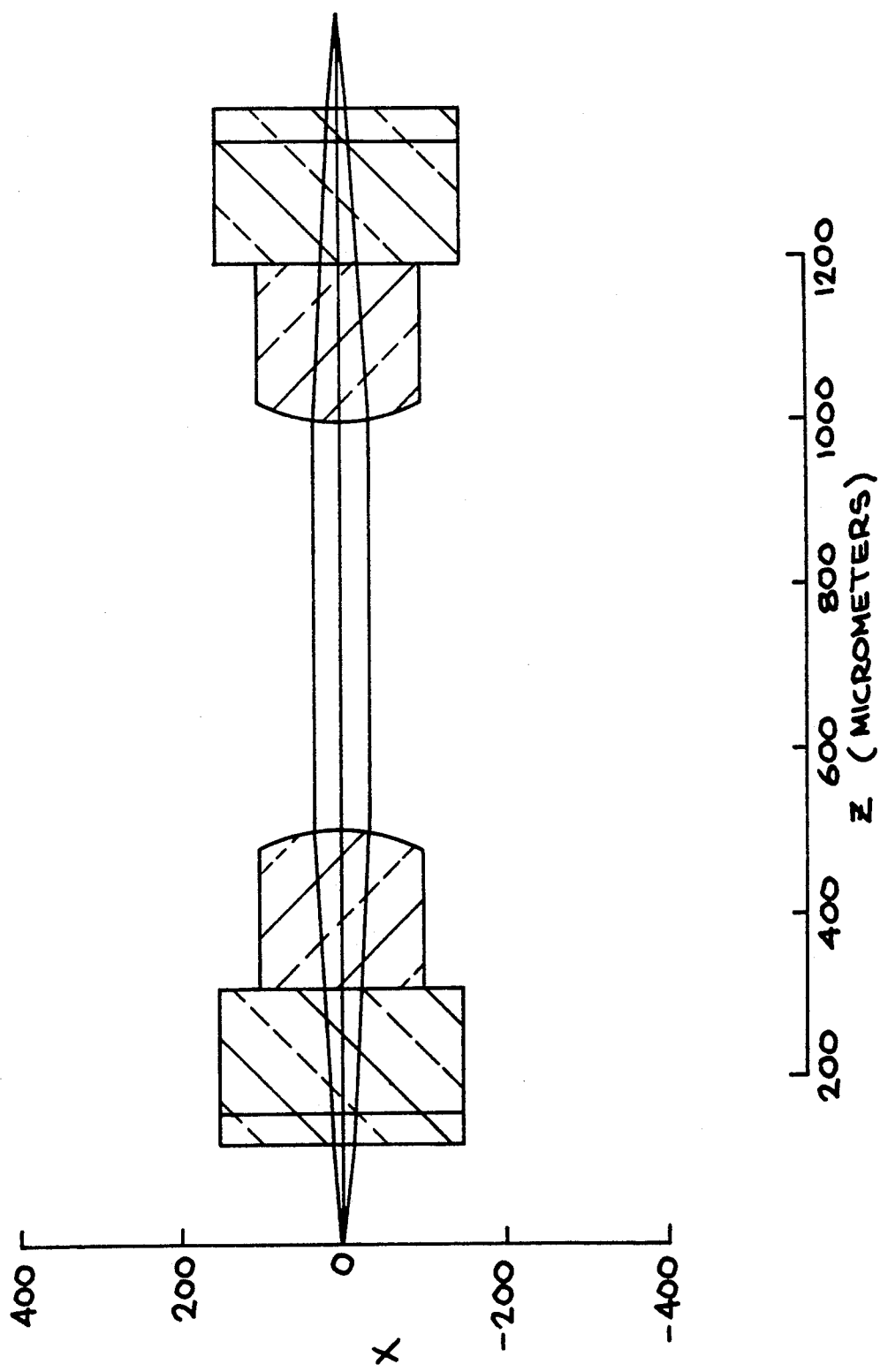
FIGS. 5A and 5B show orthogonal views of a preferred embodiment of a fiber optic coupler.
Figure 5B:
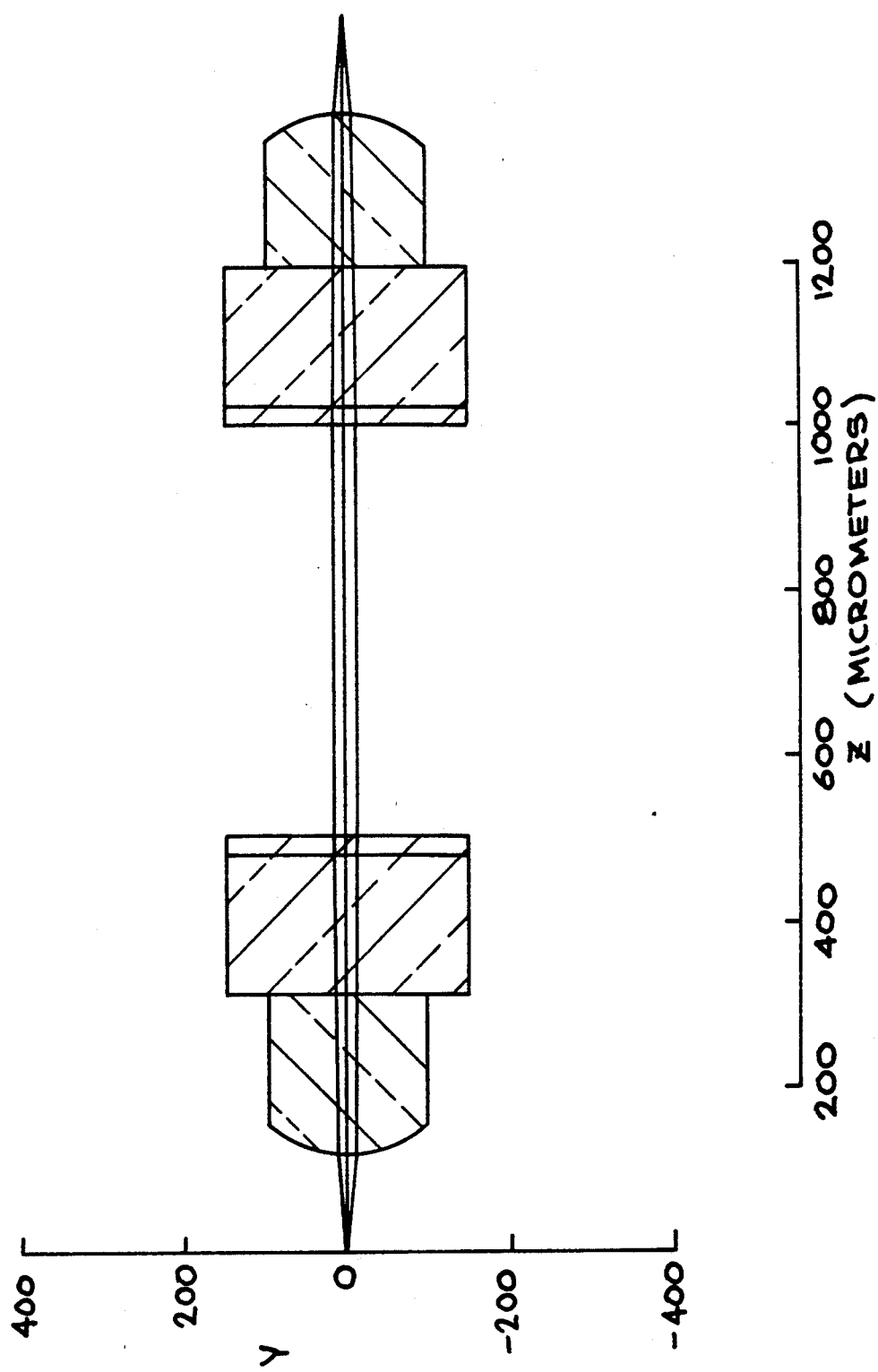

First lens L'''(nearest diode):
  $c1''' = 0.006547$/micron
  $s1''' = -2.222965$
  $z01''' = 200$ microns
  $a21''' = 0.0005055$/micron
  $w1''' = 280$ microns
  $h1''' = 280$ microns
Second lens L2''':
  $c2''' = 0.013882$/micron
  $s2''' = -0.002635$
  $z02''' = 700$ microns
  $a22''' = -0.0048344$/micron
  $w2''' = 220$ microns
  $h2''' = 220$ microns In yet another embodiment shown in FIGS. 5A and 5B, a coupler can be constructed using a first crossed lens system to collimate the output from a single mode optical fiber, which is then directed into another crossed lens which refocuses the light into a second single mode optical fiber. The system is arranged so that the ellipticity introduced in the light beam by the first lens pair is removed by the second lens pair, resulting in very efficient coupling of light between the two fibers. The two lens pairs are typically identical for optimum coupling efficiency, but different pairs can also be used. In a preferred illustrative embodiment, each pair is a collimator pair as shown in FIGS. 1A and 1B with the same design parameters.

Those skilled in the art will understand that there are many variations of the above embodiments which fall within the purview of the invention. For example, the lens system shown in FIGS. 4A and 4B could be reconfigured in a manner similar to that shown in FIGS. 2A and 2B.

I claim:

1. A crossed microlens system for collimating the output of a diode laser, comprising:
   a diode laser outputting a laser beam from a noncircular aperture having a fast axis defined by the narrowest dimension of said noncircular aperture, and a slow axis orthogonal to said fast axis, said fast axis diverging faster than the slow axis;
   first cylindrical microlens means having a shape and position for collimating said diode laser beam in a plane parallel to the fast axis; and
   second cylindrical microlens means having a shape and position for collimating light from said first lens means in a plane parallel to the slow axis.

2. A microlens system for circularizing an output beam from a diode laser having a fast axis and a slow axis, said microlens system comprising:
   a diode laser outputting a laser beam from a noncircular aperture having a fast axis defined by the narrowest dimension of said noncircular aperture, and a slow axis orthogonal to said fast axis, said fast axis diverging faster than the slow axis;
   first microlens surface means positioned in the laser beam for reducing divergence of the laser beam along the fast axis; and
   second microlens surface means spaced apart by a spaced apart distance from said first microlens surface means, said second microlens surface positioned in the laser beam for changing the divergence of the laser beam so that it is equivalent to the divergence of the output beam along the slow axis, said spaced apart distance chosen to circularize the output beam.

3. A microlens for controlling the aspect ratio and divergence of a light beam having a first axis and an orthogonal axis, the divergence of the light beam being defined to include positive and negative divergences, the light beam having an aspect ratio defined by the ratio of a first beam diameter on the first axis to a second beam diameter on the orthogonal axis, said microlens comprising:
   a first noncircular curved surface for changing the divergence of the light beam along the first axis from a first divergence to an intermediate divergence; and
   a second curved surface for changing the divergence of the beam along the first axis from the intermediate divergence to a second divergence, said second curved surface spaced apart from said first curved surface a first distance selected to provide a first aspect ratio at the second curved surface.

4. The microlens of claim 3, wherein the shape of the second curved surface is selected so that the second divergence of the beam is substantially equal to the divergence of the light beam along the orthogonal axis.

5. The microlens of claim 3, wherein the first distance is selected so that the aspect ratio of the beam at the second curved surface is approximately one.

6. The microlens of claim 5, wherein the shape of the second curved surface is selected so that the second divergence of the beam is substantially equal to the divergence of the light beam along the orthogonal axis, so that the beam output approximates a point source with approximately zero astigmatism.

7. A method for changing the aspect ratio and divergence of a source light beam first to an intermediate beam and then to an output beam, said beams having a cross-section defined by a first axis and an orthogonal axis and an aspect ratio defined by the ratio of a first beam diameter on the first axis to a second beam diameter on the orthogonal axis that may vary with the distance of propagation, the divergence being defined to include positive and negative divergences, said method comprising the steps of:
   (a) supplying a source light beam having a first divergence along the first axis and a second divergence along the orthogonal axis;
   (b) converting the first divergence along the first axis of the source beam to an intermediate divergence along the first axis of an intermediate beam by applying the source light beam to a first microlens surface that defines a first curved shape where the first axis meets said first microlens surface, said first curved shape differing in curvature from a second shape defined where the second axis of the source beam meets said first microlens surface;
   (c) converting the intermediate divergence along the first axis of the intermediate beam to a first output divergence along the first axis by applying the intermediate light beam to a second microlens surface defining a third curved shape where the first axis of the intermediate light beam meets said first microlens surface, said third curved shape differing in curvature from a fourth shape defined where the second axis meets said second microlens surface, said second microlens surface spaced apart from the first microlens surface by a first distance selected to provide a first aspect ratio of the intermediate light beam, to provide an output beam having a selected aspect ratio and divergence.

8. The method of claim 7, further comprising the step of operating a laser to supply a laser beam for the source beam.

9. The method of claim 8, wherein the laser comprises a laser diode that outputs a laser beam from a noncircular aperture that defines a fast axis by the narrowest dimension of said noncircular aperture and a slow axis orthogonal to the fast axis, and the method further comprises the step of aligning the fast axis of the laser beam to provide the first axis of the source beam.

10. The method of claim 7, wherein the first and the second microlens surfaces are positioned on a cylindrical lens having a cylindrical axis, and further comprising the step of positioning the cylindrical axis coincident with the second axis of the source beam so that first and second microlens surface together approximately maintain the second divergence of the source beam as it passes through the cylindrical microlens, and so that the second divergence of the output beam is substantially equal to the second divergence of the source beam.

11. The method of claim 7, further comprising the steps of:
defining a target position on the output beam a selected distance from the second microlens surface, and
selecting the aspect ratio in the step (c) to be approximately one at said target position.

12. The method of claim 7, wherein in the steps (b) and (c), the divergence along the first axis is converted so that the divergence of the output beam along the first axis is substantially similar to the divergence of the output beam on the second axis, so that the output beam is symmetrically diverging and approximates a point source.

13. The method of claim 12, further comprising the step of selecting the aspect ratio in the step (c) to be approximately one so that the output beam has approximately zero astigmatism.

14. An optical source and microlens assembly for providing an output beam having a selected aspect and divergence, the divergence being defined to include positive and negative divergences, said assembly comprising:
an optical source having a noncircular output aperture that defines a fast axis by the narrowest dimension of said noncircular aperture and a slow axis orthogonal to the fast axis, said optical source emitting a source beam wherein the fast axis defines a first divergence and a slow axis defines a second divergence, said source beam having an aspect ratio which varies with propagation distance, the aspect ratio defined by the ratio of a source beam first diameter on the fast axis to a source beam second diameter on the slow axis; and
a microlens, including
first surface means for changing the divergence of the beam along the fast axis from a first divergence to an intermediate divergence, said first surface means comprising a noncircular shape on the fast axis; and
second surface means for changing the divergence of the beam along the fast axis from the intermediate divergence to an output divergence of an output beam, said second surface means spaced apart from said first surface means a first distance selected to provide a selected aspect ratio at the second surface.

15. The assembly of claim 14, further comprising a laser diode to provide the optical source for emitting a source beam.

16. The assembly of claim 14, wherein the first distance is selected so that the first aspect ratio is approximately one.

17. The assembly of claim 14, wherein the curvature of the first and second surfaces are selected so that, after the laser beam exits the second surface, the divergence of the fast axis is approximate to the divergence of the slow axis.

18. The assembly of claim 14, wherein the first distance is selected so that the first aspect ratio is approximately one, and wherein the curvature of the first and second surfaces are selected so that, in the output beam, the divergence of the fast axis is approximate to the divergence of the slow axis, so that the astigmatism of the output beam is substantially zero.

19. A crossed microlens system for changing the aspect and divergence of a light beam having a cross-section defined by a first axis and an orthogonal axis, the divergence being defined to include positive and negative divergences, said microlens system comprising:
a first cylindrical microlens positioned in the light beam so that the divergence of the light beam on the first axis is changed; and
a second cylindrical microlens spaced a first distance from the first cylindrical lens, said second cylindrical microlens crossed orthogonally with the first cylindrical microlens, so that the second cylindrical lens changes the divergence of the light beam on the orthogonal axis.

20. The crossed microlens system of claim 19, wherein the light beam comprises a laser beam.

21. The crossed microlens system of claim 20, wherein a cross-section of the laser beam has a fast axis defined by the most quickly diverging dimension of the cross-section, and a slow axis that diverges substantially slower than the fast axis, said fast axis corresponding to the first axis and said slow axis corresponding to the orthogonal axis.

22. The crossed microlens system of claim 21, further comprising a laser diode having an aperture for supplying the laser beam.

23. The crossed microlens system of claim 19, wherein the first cylindrical lens has a shape for substantially collimating the first axis of the light beam, and wherein said second cylindrical lens has a shape for substantially collimating the orthogonal axis of the light beam.

24. The crossed microlens system of claim 19, wherein the first distance is selected so that the light beam is circularized at a first distance of propagation.

25. The crossed microlens system of claim 19, wherein the first cylindrical lens has a shape for focusing light energy along the first axis of the light beam at a first focal point, and wherein said second cylindrical lens has a shape for focusing light energy along the orthogonal axis of the light beam approximately at said first focal point.

26. A crossed microlens system for focusing a light beam having a cross-section defined by a first axis and an orthogonal axis, said microlens system comprising:
a first cylindrical microlens and a second cylindrical microlens positioned with its cylindrical axis crossed orthogonally with the first cylindrical microlens, said first cylindrical microlens having a shape for focusing light energy along the first axis of the light beam at a first focal point, and said second cylindrical microlens having a shape for focusing light energy along the orthogonal axis of the light beam at a second focal point.

27. The crossed microlens system of claim 26, further comprising an optical fiber having a coupling aperture positioned proximate to the first focal point so that substantial light energy along the first axis of the light beam is coupled into the optical fiber.

28. The crossed microlens system of claim 27, wherein the coupling aperture is positioned proximate to the second focal point so that substantial light energy along the second axis of the light beam is coupled into the optical fiber.

29. The crossed microlens system of claim 26, wherein the first focal point is positioned proximate to the second focal point.

30. The crossed microlens system of claim 26, wherein the light beam comprises a laser beam.

31. The crossed microlens system of claim 30, wherein a cross-section of the laser beam has a fast axis defined by the most quickly diverging dimension of the cross-section, and a slow axis that diverges substantially slower than the fast axis, said fast axis corresponding to the first axis and said slow axis corresponding to the orthogonal axis.

32. The crossed microlens system of claim 31, further comprising a laser diode having an aperture for supplying the laser beam.

33. A crossed microlens system for coupling a first optical fiber with an approximately collimated light beam having a cross-section defined by a first axis and an orthogonal axis, said microlens system comprising:
a first cylindrical microlens and a second cylindrical microlens positioned with its cylindrical axis crossed orthogonally with the first cylindrical microlens, said first cylindrical microlens having a shape for focusing light energy along the first axis of the light beam at a first focal point, and said second cylindrical microlens having a shape for focusing light energy along the orthogonal axis of the light beam at a second focal point;
wherein the first and the second focal points are positioned with respect to the optical fiber so that the light beam is substantially coupled with the fiber.

34. The crossed microlens system of claim 33, for coupling a second optical fiber to the collimated light beam that is coupled to the first optical fiber, further comprising:
a third cylindrical microlens and a fourth cylindrical microlens positioned in the collimated light beam with its cylindrical axis crossed orthogonally with the third cylindrical microlens, said third cylindrical microlens having a shape for focusing light energy along a third axis of the light beam at a third focal point, and said fourth cylindrical microlens having a shape for focusing light energy along a fourth orthogonal axis of the light beam at a fourth focal point;
wherein the third and the fourth focal points are positioned with respect to the second optical fiber so that the light beam is substantially coupled with said second optical fiber.

35. The crossed microlens system of claim 34, wherein the first cylindrical microlens and the third cylindrical microlens are positioned so that their cylindrical axes are aligned, and so that a beam exiting from the first optical fiber is collimated by the first and second microlenses, and so that said collimated beam is coupled into the second optical fiber by the third and fourth microlenses.

* * * * *